United States Patent

[11] 3,578,129

[72] Inventors Yoshiaki Kato;
Hideya Watanabe, Kamakura-shi, Japan
[21] Appl. No. 746,406
[22] Filed July 22, 1968
[45] Patented May 11, 1971
[73] Assignee Mitsubishi Denki Kabushiki Kaisha
[32] Priority Aug. 30, 1967
[33] Japan
[31] 42/55675

[54] CONTROL DEVICE FOR POSITIONING CARRIAGES OF BUSINESS MACHINES
6 Claims, 4 Drawing Figs.

[52] U.S. Cl. .................................................. 197/19,
197/65, 197/82, 197/176, 197/187
[51] Int. Cl. .................................................. B41j 5/30
[50] Field of Search .......................................... 197/19, 20, 65, 66, 82, 84, 84.1, 84.3, 176—179, 187, 188, 190, 191; 101/350 (Cursory),

[56] References Cited
UNITED STATES PATENTS

| | | | |
|---|---|---|---|
| 1,873,235 | 8/1932 | Wood ............................ | 101/350 |
| 2,018,368 | 10/1935 | Lake ............................ | 197/187UX |
| 2,153,193 | 4/1939 | Lang ............................ | 197/177X |
| 2,597,162 | 5/1952 | Mehan et al. ................ | 197/177 |
| 2,900,066 | 8/1959 | Tholstrup .................... | 197/82 |
| 2,953,231 | 9/1960 | Dersch ........................ | 197/176 |
| 2,954,860 | 10/1960 | Woodhead .................. | 197/19 |
| 2,988,193 | 6/1961 | D'Onofrio et al. .......... | 197/177 |
| 3,434,581 | 3/1969 | Shukla et al. ................ | 197/187 |

FOREIGN PATENTS

| | | | |
|---|---|---|---|
| 1,074,329 | 7/1967 | Great Britain ............... | 197/84 |

Primary Examiner—Ernest T. Wright, Jr.
Attorney—Robert D. Flynn

ABSTRACT: A control device for positioning a carriage of a business machine such as an accounting machine or a typewriter comprises means to detect the present position of the carriage, means to compare a signal produced by the detecting means with a position signal representing a predetermined carriage position a driving means driven by a command signal to drive the carriage, means driven by a command signal to fixedly locate the carriage, a braking means driven by a command signal to apply a braking force to the carriage and a control means to generate said position signal and to selectively send a control signal to respective ones of said detecting means, comparing means, driving means, locating means and braking means, to locate the carriage in a desired final position.

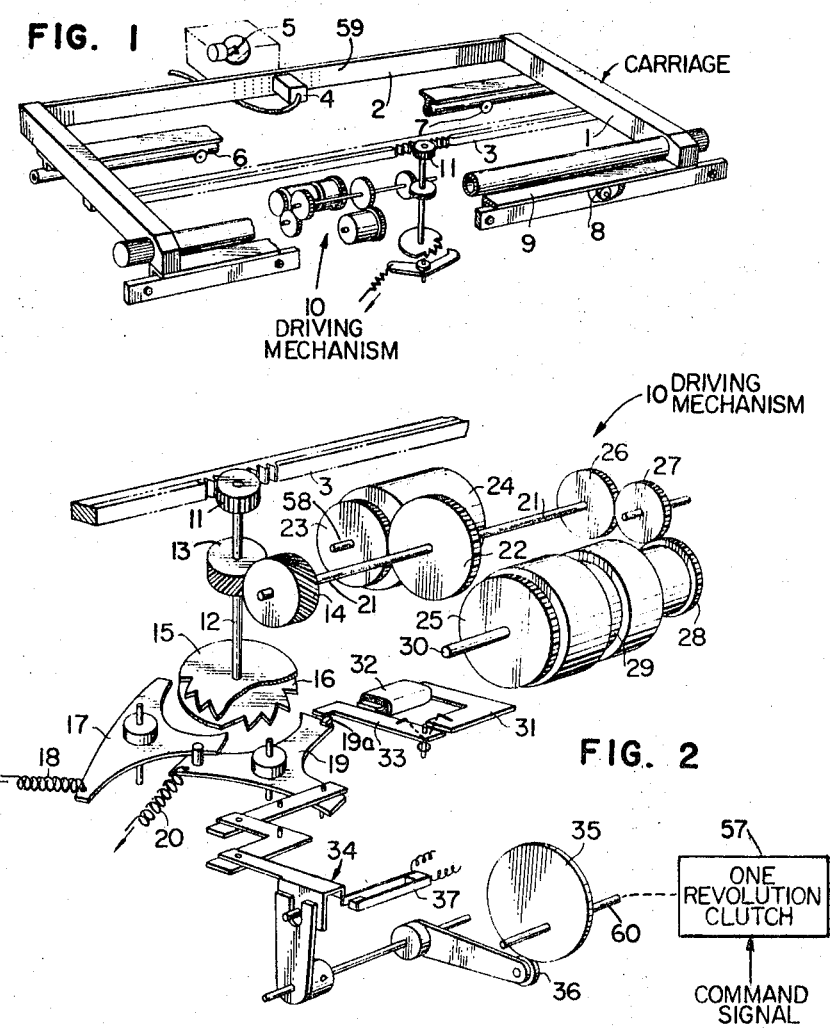

INVENTORS
YOSHIAKI KATO
HIDEYA WATANABE

CONTROL DEVICE FOR POSITIONING CARRIAGES OF BUSINESS MACHINES

BACKGROUND OF THE INVENTION

This invention relates to a control device for positioning a carriage of a business machine such as an accounting machine or a typewriter and has as its general object to correctly locate the carriage by means of an electric signal alone.

In one type of prior art carriage drive utilized in accounting machines or typewriters, the torque of a driving motor is transmitted to the carriage through a friction disc clutch, and a rack and pinion so that the carriage is driven in the forward direction by means of the tension of a spring, and in the reverse direction by means of the torque of the motor. In other systems, the carriage is driven by a motor through a mechanical or electrical friction disc clutch both in the forward and reverse directions.

To position and stop the carriage in prior art systems, a programming bar incorporated with a cam or a stop having a predetermined stop position is mounted upon the carriage so as to engage the cam or stop of the carriage against a counterstop of a carriage stopping means which is secured to the main body of the business machine. The counterstop of this carriage stopping means is associated with a cushioning means utilizing oil or air. The position of the cam or stop mounted upon the carriage of the business machine is preset to correspond to the position of printing of a business form or book to be prepared by the machine.

In such prior art carriage position control devices, as the stopping position is preset and as the stopping program thereof is mounted as a physical portion of the machine, change of the program for stopping positions requires replacement of the programming bar or change of the cam or stop. This not only requires substantial labor and time but also makes it impossible to greatly reduce the physical dimensions of the cam or stop. For this reason even when a number of cams or stops are mounted in side by side relationship, the number of stop positions controllable by a single programming bar is limited.

Further, as the prior art accounting machines utilize an external program system wherein a succeeding program is read at the stop position to proceed with the program operation, the number of stops at the same positioning cam in one program is also limited so that it is impossible to stop many times at the same position during one program.

Furthermore, since fabrication of the components such as mechanical cams, stop bars or stop mechanisms involve manufacturing errors, it is necessary to adjust the mounting positions when a programming bar provided with cams or stops is mounted upon a carriage. When mounting a particular programming bar on the carriage of another accounting machine, it is necessary to readjust the mounting position thereof so that proper operation results. Thus, the interchangeability of the programming bar is small. Where it is desired to perform many types of business operations by the same business machine, it is necessary to prepare a number of programming bars, the number of bars corresponding to the number of types of business operations to be performed. (Change of cams results in loss of time). This requires a large expense as well as a large space for storing spare programming bars.

SUMMARY OF THE INVENTION

This invention contemplates controlling the positioning and stopping of the carriage of a business machine by electrical signals similar in nature to the program signals commanding other functions of the business machine (operation, printing, and the like), to enable the carriage to move and stop at any desired position. A memory may be provided to store the program of the operation of the business machine including stopping positions, thus eliminating the above-described defects of the prior art including the necessity of changing the program of stopping positions, the limitation on the number of stops and the expense of programming. The memory may be a card, tape, magnetic drum, or magnetic disc storage unit or the like.

Briefly stated, the control device for positioning a carriage of a business machine constructed in accordance with the principle of this invention comprises means to detect the present position of the carriage, a comparator to compare a signal for commanding a stopping position of the carriage with a signal produced by the detecting means, a driving means driven by a command signal to drive the carriage, means driven by a command signal to fixedly locate the carriage, a braking means driven by a command signal to apply a braking force to the carriage and a control means to selectively send a control signal to respective ones of said driving means, locating means, braking means and comparator means.

BRIEF DESCRIPTION OF DRAWING

This invention can be more fully understood from the following detailed description, reference being made to the accompanying drawing in which:

FIG. 1 is a perspective view of parts associated with a carriage of an accounting machine;

FIG. 2 is a diagrammatic exploded perspective view of a driving mechanism embodying this invention;

DESCRIPTION OF THE PREFERRED EMBODIMENTS

Figure 3:
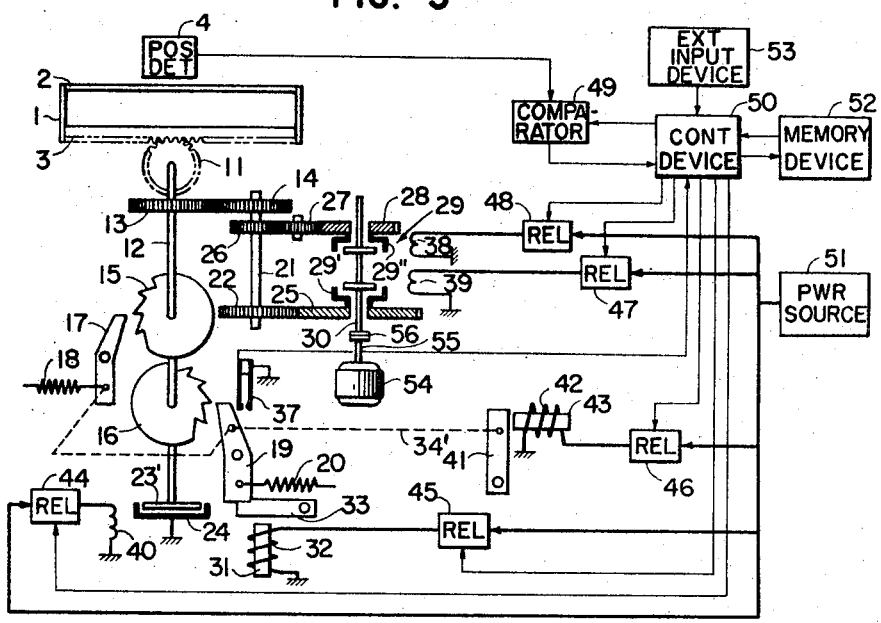
FIG. 3 shows a block diagram of one embodiment of this invention.

Referring now to the accompanying drawing, FIG. 1 shows the construction of the components associated with a carriage of a business machine, such as an accounting machine, and the relation between the carriage and a mechanism for driving the same.

As shown in FIG. 1, a carriage 1 is provided with a code board 2 to control the positioning of the carriage 1. Code board 2 is provided with a number of perforations 59 encoded to represent addresses of the stopping positions, the spacing between perforations 59 corresponding to the minimum pitch of the stopping positions (or distance between adjacent stopping positions) of the carriage 1. A rack 3 is provided longitudinally of the carriage 1. Cooperating with the code board 2 is a detector 4 consisting of a photoelectric responsive element such as a phototransistor or a photocell, the detector 4 being arranged to receive the light from a lamp 5 to detect the present address of the carriage 1 in terms of a particular code. The carriage 1 is movably mounted upon guide rails 6 and 9 by means of wheels 7 and 8. The carriage 1 is arranged to be driven by a driving mechanism 10 through a pinion 11 meshing with the rack 3.

FIG. 2 shows the details of the construction of the driving mechanism 10. As shown in FIG. 2, the pinion 11 is mounted on a shaft 12 which also carries a gear 13 meshing with a gear 14 and two ratchet wheels 15 and 16 cooperating with pawls 17 and 19, respectively, which are biased by springs 18 and 20. The gear 14 is mounted on one end of a shaft 21. A gear 22 mounted on an intermediate point of shaft 21 meshes with a gear 23 secured to an input shaft 58 of an electromagnetic brake 24 and with a gear 25 mounted on one output shaft 30 of an electromagnetic clutch 29 of the one input-two output type. A gear 26 mounted on the other end of the shaft 21 meshes with a gear 28 connected to the other output of the electromagnetic clutch 29 through an intermediate gear 27.

One pitch of ratchet wheels 15 and 16 mounted upon the common shaft 12 is designed to correspond to the movement of one pitch of the carriage 1 with the rack 3 driven by the pinion 11, this pitch being taken as the reference for the minimum distance required for positioning the carriage 1.

When a coil 32 of an electromagnet 31 is energized the armature 33 thereof releases from a protrusion 19a on the pawl 19 so that pawls 17 and 19 are urged against ratchet wheels 15 and 16 under the bias of springs 18 and 20, respectively.

The shaft 60 of an eccentric cam 35 is connected to a one revolution clutch 57 actuated by electric command signals so that cam 35 is rotated one revolution for each electric command signal to disengage pawls 19 and 17 from ratchet wheels 16 and 15 via a roller 36 engaging the cam 35 and a linkage mechanism 34.

The operation of the novel control device for positioning the carriage 1 having a driving mechanism 10 of the construction described hereinabove will now be described with reference to the block diagram shown in FIG. 3 in which corresponding parts are designated by the same reference numerals as in FIGS. 1 and 2. FIG. 3 illustrates a linkage mechanism 34' as a dashed line for the sake of simplicity. Electromagnet 43 including coil 42 and armature 41 controls linkage 34', which is of a different construction than linkage 34 of FIG. 2. Also switch 37 is in a different physical position in FIG. 3.

As shown in FIG. 3, an electric motor 54 is connected to drive shaft 21 through gears 22 and 25, or through gears 26, 27 and 28 and an electromagnetic clutch 29 consisting of two component clutches 29' and 29''. Energizing coils 38 and 39 for these clutches 29' and 29'', coils 42 and 32 of electromagnets 43 and 31 and brake coil 40 are energized by a power source 51 through relays 48, 47, 46, 45 and 44, respectively. These relays 44—48 are controlled by a control device 50 under the control of a memory device 52 installed in the machine, which stores various orders, programs and data required for accounting business machine operation. The control device 50 not only controls the positioning of the carriage 1 but also controls other functions of the accounting machine including operation and printing and includes various logical circuits, registers, and counters, all as well known in the art to perform its desired function. A comparator 49 is provided to compare address code signals detected by the position detector 4 associated with the carriage 1 and command address code signals from the control device 50. Further an external input device 53 is associated with the control device 50. A more detailed description of the internal construction of control device 50, comparator 49, memory 52 and external input device 53 is not necessary to enable one ordinarily skilled in the art to understand the present inventive concept and to practice same.

In the following, (I) the theory of operation of the control device 50 for positioning the carriage 1, (II) forward movement (part 1), (III) forward movement (part 2), (IV) forward movement (part 3), (V) reverse movement (part 1) and (VI) reverse movement (part 2) are described in detail with reference to FIG. 3.

I. THEORY OF OPERATION

In the block diagram shown in FIG. 3, while the shaft 55 of motor 54 is rotating, so long as energizing coils 38 and 39 of the electromagnetic clutch 29 are deenergized, the input shaft 30 thereof will be rotated via coupling 56, but gears 25 and 28 will not be rotated. Thus the output shaft 21 will not be rotated. When a coil 40 of a brake 24 is deenergized, thus causing wheel 23' to become disengaged within brake 24, and when pawls 17 and 19 are disengaged from ratchet wheels 15 and 16 by the action of the armature 33, energization of coil 39 of the electromagnetic clutch 29 results in the unitary rotation of the clutch input shaft 30 and a gear 25 mounted thereon. This rotation is transmitted to shaft 12 through gears 22, 14 and 13 to move the carriage 1 along guide rails 6 and 9 by means of the pinion 11 and rack 3. For convenience this movement of the carriage 1 toward the right is designated as the forward movement. The movement of the carriage 1 toward the left when the coil 38 of the electromagnetic clutch 29 is energized is designated as the reverse or return movement.

When the carriage 1 is stationed at a preselected position, the pawls 19 and 17 engage ratchet wheels 16 and 15 respectively. Electromagnetic clutch 29 is of the type that can transmit high and low torques by selective energization of two coils 38 and 39 under the control of relays 48 and 47. When the coil 39 is energized by a small current, carriage 1 is biased to the right but this movement is arrested by the engagement of the pawl 19 with the ratchet wheel 16.

II. FORWARD MOVEMENT (part 1)

The command for the forward movement of the carriage 1 is made by the control device 50 which commands the next stopping position with reference to a position address of the code board 2 mounted upon the carriage 1 in response to a command signal generated by the manual operation of a key or button, or in response to a command signal from a tape reading device, a card reading device or the external input device 53, or in response to a command signal generated by a control program for positioning the carriage 1 stored in the memory device 52.

Responsive to the order for movement, the control device 50 sends a signal to the relay 46 to energize the coil 42 of electromagnet 43 to attract the armature 41. As a result pawls 19 and 17 are caused to disengage from the ratchet wheels 16 and 15 through a linkage 34' or other suitable power or displacement amplifying mechanism. Concurrently therewith a switch 37 is operated due to disengagement of pawls 17 and 19 to send a signal to the relay 47 via control device 50, that confirms the disengagement of pawls 19 and 17, thus switching the exciting current through the coil 39 from a low value to a high value. As a result the electromagnetic clutch 29' will transmit a high torque to accelerate the carriage 1 by means of the driving pinion 11. After the carriage 1 has been accelerated to a speed synchronous with the speed of the motor 54, it will be driven at a constant speed. The carriage position detector 4 always detects the present position of the carriage 1 to send a detect signal to the comparator 49. When the carriage 1 reaches a position which is several pitches before the stopping address commanded by the external input device 53 or the program stored in the memory device 52, as determined by taking into consideration the braking distance, or when the stopping position address of the carriage 1 is increased one by one in the forward direction, braking is begun. The comparator 49 compares the detected address (from detector 4) with the commanded stopping address minus the number of pitches required for braking and upon reaching a position of coincidence, the control device 50 is supplied with a signal from the comparator 49. In response to the signal from comparator 49, control device 50 sends signals to relays 44 and 47 to supply an exciting current of high value to the coil 40 of the brake 24, it being understood that the electromagnetic brake 24 is of the type that can provide a braking torque that can be varied in two or three steps under control of the relay 44. Simultaneously therewith, the exciting current through the coil 39 is switched from the high to low value to apply a braking force to the carriage 1. While decelerating, the carriage 1 continues to advance and when it reaches a position one pitch before the commanded stopping address, that is, when the comparator 49 detects coincidence between the detected address and the commanded stopping address minus one pitch, the comparator 49 will send a signal to the control device 50 to cause it to send a signal to the relay 45, thus energizing the coil 32 of the electromagnet 31.

The thus energized electromagnet 31 attracts the armature 33 to cause pawls 19 and 17 to engage wheels 16 and 15, respectively. Thus, the carriage 1 will not be advanced beyond the commanded stopping position and will be stopped at a point between the commanded stopping position and a position one pitch preceding it. Alternatively the carriage 1 will be stopped when the pawl 19 engages ratchet wheel 16 at a very low speed.

Braking coil 40 is deenergized substantially simultaneously with the stoppage of the carriage 1 according to the command signal from the control device 50 (the interval of excitation is predetermined) to remove the braking force. Under these conditions the carriage 1 will be advanced by the force created by the low exciting current flowing through the coil 39 until it is finally stopped by the engagement of ratchet wheel 16 and pawl 19.

III. FORWARD MOVEMENT (part 2)

During a forward movement when the distance of movement (or stroke) is smaller than the braking distance, in other words, when the number of pitches travelled is equal to from two to several pitches (the braking distance is normally several pitches) the order of commands is slightly different. The commands may be derived during the course of programming. Alternatively the control device 50 functions to compare the address representing the present position of the carriage 1 and the address to which the carriage 1 is to be moved, and to derive a succeeding order of commands as the result of comparison.

When the program or the control device 50 judges that the desired forward movement is within this range, the control device 50 will send a signal to the relay 46 to energize the coil 42 of the electromagnet 43. As a result, the armature 41 is attracted to disengage pawls 19 and 17 from ratchet wheels 16 and 15 through linkage 34' or the like. The the carriage 1 will be accelerated slowly by the low driving torque which is created by the low exciting current through the coil 39 and transmitted by the clutch 29.

A predetermined time after receiving a pawl disengaging signal from the switch 37, the control device 50 operates the relay circuit 44 to provide a low exciting current to the coil 40 of the brake 24. The braking force provided by the low exciting current flowing through the brake coil 40 is substantially equal to the driving force afforded by the low exciting current flowing through the coil 39 of the clutch 29' so that the travelling speed of the carriage 1 will be balanced at a speed lower than a speed which is synchronous with the speed of the motor 54. When the carriage 1 arrives at a position at which the signal provided by the carriage position detecting device 4 becomes equal to the address corresponding to the address of the commanded stopping position minus one pitch, a signal is applied to the control device 50 from the comparator 49 to cause the relay 44 to switch the exciting current flowing through the brake coil 40 from the low to the high value. At the same time, relay 45 is energized to send a signal to energize the coil 32 of the electromagnet 31 to attract the armature 33, thus engaging pawls 19 and 17 with ratchet wheels 16 and 15 respectively.

As a result, a braking force is applied to the carriage 1 to decelerate it and the ratchet wheel 16 will be urged against the pawl 19 at a very low speed. After a predetermined time, the high exciting current through the brake coil 40 is interrupted so that the carriage 1 will be correctly positioned because the ratchet wheel 16 is urged against the pawl 19 by the low driving torque caused by the low exciting current through the coil 39 of the clutch 29'.

IV. FORWARD MOVEMENT (part 3)

When the carriage 1 is moved to the next adjacent address, or in the case of one pitch travel, the control device 50 functions to cause the relay 46 to energize the coil 42 of the electromagnet 43 whereby the armature 41 is attracted to disengage pawls 19 and 17 from ratchet wheels 16 and 15 through the linkage 34' or the like, the disengaged pawls 19 and 17 being held in the disengaged position by the armature 33 of the electromagnet 31. As the carriage 1 is subjected to the low driving torque created by the low exciting current flowing through the coil 39 of the clutch 29', it will begin to slowly accelerate and travel in the forward direction after disengagement of the pawl 19 from the ratchet wheel 16. Then, the control device 50 receives a release confirmation signal of pawls 19 and 17 from the switch 37, and then causes the relay 45 to energize the coil 32 of the electromagnet 31 to attract the armature 33 whereby pawls 19 and 17 are caused to engage the next adjacent teeth corresponding to the next stopping position one pitch ahead on the ratchet wheels 16 and 15. At a predetermined time after reception of the release confirmation signal of pawls 19 and 17 from switch 37, the control device 50 functions to cause the relay 44 to pass the high exciting current through the brake coil 40 to apply a high braking force to carriage 1. Thus the speed of the carriage 1 is reduced until it is finally stopped with the pawl 19 engaging the ratchet wheel 16 at a very low speed. After a definite time, the brake coil 40 is deenergized by control device 50 to remove the braking force. Thus the position of the carriage 1 will be precisely arrived at only by the low driving force provided by the clutch 29' and engagement between the pawl 19 and ratchet wheel 16.

V. RETURN MOVEMENT (part 1)

Movement from the stopped state or the return movement upon energization of the coil 38 of the clutch 29'' is as follows:

Responsive to a command signal (or travel order) from the external input device 53 or to a travel order read out of the memory device 52, the control device 50 operates to cause the relay 46 to energize the coil 42 of the electromagnet 43 whereby the armature 41 is attracted to disengage pawls 19 and 17 from ratchet wheels 16 and 15 directly through the linkage 34' or the like. Responsive to the signal from the switch 37 that confirms the disengagement of pawls 19 and 17 from ratchet wheels 16 and 15, the control device 50 operates to send a command signal to the relay 48 to supply a high exciting current to the coil 38 of the clutch 29''. As a result, the revolution of the input shaft 30 of the clutch 29 will be transmitted to shaft 12 through gears 28, 27, 26, 14 and 13 to apply a driving force to the carriage 1 through the driving pinion 11 to accelerate it in the reverse direction. After reaching a speed synchronous with the speed of the motor 54, the carriage 1 will be driven at a constant speed.

During the travel of the carriage 1, the carriage position detecting device 4 operates to detect the present position on the code board 2 mounted on the carriage 1 in terms of an encoded address and as it reaches a position several pitches before the address of the stopping position commanded by the external input device 53 or commanded by the program readout of the memory device 52, or a position as determined by taking into consideration the braking distance of the carriage 1, the comparator 49 will operate to compare the detected address with an address stored therein and which represents the commanded stopping address plus the number of pitches required for braking. Upon coincidence of these addresses, the comparator 49 will send a coincidence signal to the control device 50. In response to this coincidence signal, the control device 50 will cause relays 48 and 44 to switch the exciting current through the coil 38 of the clutch 29'' from the high to low value while at the same time to changing exciting current through the coil 40 of the brake 24 to the high value, thereby supplying a high braking force to the carriage 1 through the driving pinion 11.

The carriage 1 continues to travel while decelerating and upon coincidence of the address of the position detected by the position detecting device 4 when the carriage 1 arrives at the commanded stopping position, the control device 50 will be supplied with a signal from the comparator 49. The control device 50 then supplies command signals to relays 48, 47 and 46 to interrupt the exciting current through the coil 38 of the clutch 29'', to excite the coil 39 of the clutch 29 by the low exciting current and to excite the coil 32 of the electromagnet 31 to attract the armature 33, thereby engaging pawls 19 and 17 with ratchet wheels 16 and 15. Thus, the carriage 1 is caused to stop by the braking force at a position one pitch ahead of the stopping position. When the tooth of the ratchet wheel 15 becomes engaged against pawl 17 the carriage 1 is moving at substantially zero speed.

The exciting current flowing through the brake coil 40 is interrupted after a predetermined time whereby the brake 24 applies the braking force for a definite time interval. Accordingly as soon as the return movement is stopped, the carriage 1 will be slightly moved in the forward direction or to the right as viewed in FIG. 3 by the low driving force created by the low exciting current flowing through the coil 39 of the clutch 29' until it is stopped at the precise position as determined by the engagement between pawl 19 and ratchet wheel 16.

Figure 4:
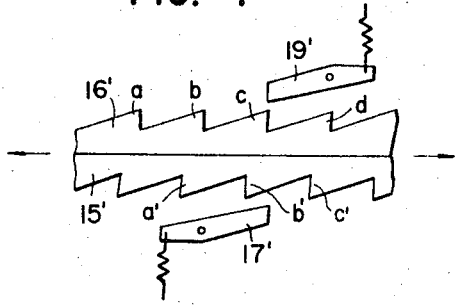
FIG. 4 is a diagram to explain the relationship between the pawls and ratchet wheels.

The relationship between the pawls 17 and 19 and the ratchet wheels 15 and 16 will now be considered more in detail. Turning now to FIG. 4, a rack 16' corresponds to the ratchet wheel 16 and a rack 15' to the ratchet wheel 15. The forward movement of the carriage 1 corresponds to the right hand movement of racks 16' and 15' and the return movement corresponds to the left-hand movement of racks 16' and 15'. The relative position between ratchet wheels 16 and 15 and pawls 19 and 17 FIGS. 1—3 corresponds to that between racks 16' and 15' and pawls 19' and 17' shown in FIG. 4. Rack 16' includes teeth, $a$, $b$, $c$ and $d$, and rack 15' includes teeth $a'$, $b'$ and $c'$.

When the carriage 1 is at a standstill, it is subjected to a force towards the right (or in the forward direction) with the pawl 19' urged against a tooth of the rack 16'.

Referring to FIGS. 3 and 4 and assuming now that, during the return travel, the commanded stopping position corresponds to a condition wherein a tooth $c$ of the rack 16' is decelerating to the position shown, then when the electromagnet 31 shown in FIG. 3 is operated, pawls 19' and 17' will be caused to engage the teeth of racks 16' and 15'. The carriage 1 will continue its movement and will stop when the pawl 17' is at a point intermediate teeth $b'$ and $c'$ or until the pawl 17' comes to engage a tooth $c'$ of the rack 15'. After the lapse of a definite time interval the braking force disappears so that the carriage 1 (or the rack 3) will be moved to the right or in the forward direction by the low torque transmitted by the clutch 29' until the pawl 19' engages tooth $c$ of the rack 16'.

VI. RETURN MOVEMENT (part 2)

Travel over a distance less than the braking distance which has been described in connection with the return movement (part 1) is effected in the following manner.

In response to a command signal from the external input device 53 or a program read out of the memory device 52, the control device 50 functions to cause relays 47, 48 and 46, respectively to interrupt the exciting current through the coil 39 of the clutch 29', to energize the coil 38 of the clutch 29" with the low exciting current, and to energize the coil 42 of the electromagnet 43 to attract the armature 41 of the electromagnet 43. Rotation of the motor shaft 55 is transmitted to the gear 28 which is connected to the clutch 29" from the input shaft 30 thereof, and then transmitted to the shaft 12 through gears 27, 26, 14 and 13 to drive the carriage 1 in the return direction through the driving gear 11. The control device 50 receives a signal from switch 37 confirming the disengagement of the pawls 19 and 17 from ratchet wheels 16 and 15 and then causes the coil 40 of the brake 24 to be excited by the low exciting current via relay 44 after the lapse of a predetermined time, thus applying a braking force to the carriage 1.

The carriage driving force created by the low exciting current flowing in the clutch 29" and the braking force created by low exciting current flowing through the brake 24 balance each other so that the carriage 1 continues to travel with a speed less than the maximum speed which is synchronous with the speed of the motor 54. When the carriage 1 arrives at the commanded stopping position and the address of the position detected by the detecting device 4 coincides with the address of the commanded stopping position, the comparator 49 will apply a coincidence signal to the control device 50 thus causing relays 48, 47, 45 and 44 to operate to interrupt the low exciting current flowing through the coil 38 of the clutch 29", to supply the low exciting current to the coil 39 of the clutch 29', to switch the exciting current flowing through the coil 40 of the brake 24 from the low to high value and to energize the coil 32 of the electromagnet 31 to attract the armature 33 thus causing pawls 19 and 17 to engage with ratchet wheels 16 and 15. Inasmuch as the carriage 1 is balanced at a speed about one half of the maximum speed it will be decelerated by the braking force over a relatively short distance until finally stopped by the engagement of a tooth of the ratchet wheel 15 with the pawl 17. The high exciting current flowing through the brake coil 40 will be interrupted after the lapse of a definite time after it has been switched to the high value to remove the braking force. Thereafter the carriage 1 will be returned in the forward direction by the carriage driving force due to the low exciting current flowing through the coil 39 of the clutch 29' until it is positioned at the precise position established when the pawl 19 engages a tooth of the ratchet wheel 16.

As has been described hereinbefore, according to the present invention there is provided a control apparatus comprising a carriage locating means such as a ratchet mechanism 15, 16 having pawls 17, 19 operated by an electric signal, a carriage driving means such as an electromagnetic clutch 29 capable of varying the torque transmitted, thereby controlling its exciting current, a braking means such as an electromagnetic brake 24 adapted to apply braking force to said carriage 1, means 4 to detect the position of the carriage 1, means 49 to detect the position of the carriage 1 in terms of electric signals and a control device 50 adapted to control the above described means whereby to move and stop the carriage 1 at any position.

Thus, the carriage 1 can be repeatedly stopped to enable printing at any position so that it can perform very complicated operations. In addition, like other orders for operation and printing, the program regarding the stopping position can be stored in a memory device 52 within the business machine. Further, if suitable input and output apparatus were incorporated, these programs can be stored in cards or tapes thus enabling the storage of various types of business programs at a low expense. Furthermore, a change of program does not require the adjustment of the stopping position and since the stopping position could also be programmed, a high degree of interchangeability of the program can be realized.

While the invention has been explained by describing a particular embodiment thereof, it will be apparent that improvements and modifications may be made without departing from the true spirit and scope of the invention as defined in the appended claims.

We claim:

1. A control device for positioning a carriage of a business machine comprising:
    driving means responsive to command signals for driving said carriage, said driving means developing first and second driving torques of different value;
    position detecting means coupled to said carriage for providing signals representative of the actual position of said carriage;
    braking means responsive to a braking signal for applying a braking force to said carriage;
    locating means operable after said braking force is applied for fixedly locating said carriage at a given position;
    means providing a signal representing a desired stopping position of said carriage;
    comparator means for comparing the output of said position detecting means with said signal representing a desired stopping position; and
    control means responsive to the output of said comparator means to generate said command signals, said braking signal, and a signal operating said locating means, for operating said locating means only when said driving means is not operating at its high torque value.

2. A control device according to claim 1 wherein said control means provides said signal representing a desired stopping position of said carriage.

3. A control device according to claim 1 wherein said position detecting means includes a code board mounted on said carriage for encoding positions of said carriage, and means responsive to said code board to generate signals representing the positions of said carriage.

4. A control device according to claim 3 wherein said means responsive to said code board includes a photoelectric element.

5. A control device according to claim 1 wherein said locating means includes a ratchet and pawl mechanism coupled to said carriage and operable by said control means.

6. A control device according to claim 1 wherein said braking means is an electromagnetic braking means.